(12) United States Patent
Engel et al.

(10) Patent No.: US 8,010,454 B2
(45) Date of Patent: Aug. 30, 2011

(54) SYSTEM AND METHOD FOR PREVENTING FRAUD IN CHECK ORDERS

(75) Inventors: Lisa Engel, Minneapolis, MN (US); Dianne Bellefeuille, Farmington, MN (US); Jeff F. Pust, Andover, MN (US)

(73) Assignee: Paper Payment Services LLC, Shoreview, MN (US)

( * ) Notice: Subject to any disclaimer, the term of this patent is extended or adjusted under 35 U.S.C. 154(b) by 0 days.

(21) Appl. No.: 12/839,212

(22) Filed: Jul. 19, 2010

(65) Prior Publication Data

US 2011/0016031 A1 Jan. 20, 2011

Related U.S. Application Data

(63) Continuation of application No. 10/702,121, filed on Nov. 5, 2003, now abandoned.

(60) Provisional application No. 60/434,266, filed on Dec. 17, 2002.

(51) Int. Cl.
*G06Q 40/00* (2006.01)

(52) U.S. Cl. ........................................................ 705/45

(58) Field of Classification Search ...................... 705/45
See application file for complete search history.

(56) References Cited

U.S. PATENT DOCUMENTS

| | | | |
|---|---|---|---|
| 4,891,503 A | 1/1990 | Jewell | |
| 5,309,363 A | 5/1994 | Graves et al. | |
| 5,708,422 A | 1/1998 | Blonder et al. | |
| 5,781,654 A | 7/1998 | Carney | |
| 5,819,226 A | 10/1998 | Gopinathan et al. | |
| 5,866,889 A | 2/1999 | Weiss et al. | |
| 6,070,150 A | 5/2000 | Remington et al. | |
| 6,076,075 A | 6/2000 | Teicher | |
| 6,105,007 A | 8/2000 | Norris | |
| 6,105,010 A | 8/2000 | Musgrave | |
| 6,108,670 A * | 8/2000 | Weida et al. | 1/1 |
| 6,158,657 A | 12/2000 | Hall et al. | |
| 6,181,814 B1 | 1/2001 | Carney | |
| 6,227,447 B1 | 5/2001 | Campisano | |
| 6,330,546 B1 | 12/2001 | Gopinathan et al. | |
| 6,338,049 B1 | 1/2002 | Walker et al. | |
| 6,341,724 B2 | 1/2002 | Campisano | |
| 6,450,403 B1 | 9/2002 | Martens et al. | |

(Continued)

OTHER PUBLICATIONS www.checkworks.com, web.archive.org, Dec. 4, 2002.*

(Continued)

*Primary Examiner* — Charles R Kyle
*Assistant Examiner* — Clifford Madamba
(74) *Attorney, Agent, or Firm* — Schwegman, Lundberg & Woessner, P.A.

(57) ABSTRACT

A system and method for processing paper check orders. The system comprises client storage capable of storing client information including data from previous paper check orders, suspect check order storage capable of storing suspicious order information including data associated with previous improper check orders, an order entry system for inputting order information having order parameters, and a programmable scoring system in communication with the client storage and the suspect order storage. The scoring system is capable of applying scoring rules to score paper check orders and the scoring rules are programmably adjustable for variable weights to the order parameters. The programmable scoring system is capable of comparing input order information to the client information and the suspicious order information and producing a score according to the scoring rules to determine check orders that require further investigation.

50 Claims, 5 Drawing Sheets

U.S. PATENT DOCUMENTS

| | | | |
|---|---|---|---|
| 6,535,728 | B1 | 3/2003 | Perfit et al. |
| 6,567,791 | B2 | 5/2003 | Lent et al. |
| 6,617,969 | B2 | 9/2003 | Tu et al. |
| 6,714,918 | B2* | 3/2004 | Hillmer et al. ............... 705/18 |
| 6,731,737 | B2* | 5/2004 | Davis et al. ............. 379/218.01 |
| 6,975,708 | B1* | 12/2005 | Scherer .................... 379/88.22 |
| 7,006,632 | B2 | 2/2006 | Meadow et al. |
| 7,177,846 | B2 | 2/2007 | Moenickheim et al. |
| 7,788,175 | B1 | 8/2010 | Hadfield |
| 2002/0103711 | A1 | 8/2002 | Karas et al. |
| 2004/0138975 | A1 | 7/2004 | Engel et al. |
| 2004/0230448 | A1 | 11/2004 | Schaich |

OTHER PUBLICATIONS www.checkworks.com, web archive.org, (Dec. 4, 2002).

"U.S. Appl. No. 10/702,121 Non-Final Office Action mailed Feb. 28, 2008", OARN, 22 Pgs.

"U.S. Appl. No. 10/702,121 Response filed Aug. 28, 2008 to Non-Final Office Action mailed Feb. 28, 2008", 16 pgs.

"U.S. Appl. No. 10/702,121 Non-Final Office Action mailed Nov. 26, 2008", 22 pgs.

"U.S. Appl. No. 10/702,121, Response filed Apr. 27, 2009 to Non Final Office Action mailed Nov. 26, 2008", 13 pgs.

"U.S. Appl. No. 10/702,121, Final Office Action mailed Aug. 24, 2009", 28 Pgs.

"At a Glance: Secure Mail", Deluxe Financial Services, Inc., (May 2000), 5 pgs.

"Canadian Application No. 2451015, Office Action mailed Jan. 5, 2009", 2.

"Checkworks.com", web.archive.org, (Sep. 26, 2002), 12 pgs.

"Clarke American Installs Fraud Prevention Software", Business Wire, (Jan. 7, 2002), 2 pgs.

"Clarke American Introduces ExpertChecks.com; Internet Application Designed Specifically for Business Customers", Business Wire, (Nov. 4, 2002), 2 pgs.

"Deluxe Offers a SAFER Check Package", Deluxe Financial Services, (1999), 1 pg.

"Deluxe Secure Mail", Deluxe Fraud Study, 1999, Final SecureMail Sell Sheet, (1999).

"Information Technology Helps Deliver Error-Free Check Orders", http://www.clarkeamerican.com/www/content/PressRel/2001/addressnet0401.html, (Apr. 2001), 2 pgs.

"Keeping Your Checks Secure; Secure Mail Article—Credit Union to Member Version", Deluxe Financial Services, (2000), 1 pg.

"Secure Mail SM Service Offers Comprehensive Approach to Fighting Check Order Fraud", SecureMail Article—Deluxe to Credit Union Article (for credit association newsletter), (2000), 2 pgs.

"Secure Mail SM Service Offers Comprehensive Approach to Fighting Check Order Fraud", Deluxe Financial Services, (2000), 1 pg.

"SecureMail (Advitorial)", Deluxe Financial Services, (Nov. 1999), 5 pgs.

Diekmann, Frank J., "Hot Check? A Little Hot Air Can Provide an Answer", Credit Union Journal, (Jun. 11, 2001), 2 pgs.

"American Banker. Computerized Device Could Bring Check Printing In-House", (Nov. 17, 1982), 1-4 pages.

"U.S. Appl. No. 10/702,121, Decision on Pre-Appeal Brief Request mailed Mar. 18, 2010", 2 pgs.

"U.S. Appl. No. 10/702,121, Pre-Appeal Brief Request filed Jan. 28, 2010", 5 pgs.

"U.S. Appl. No. 10/778,674, Final Office Action mailed Oct. 23, 2009", 35 pgs.

"U.S. Appl. No. 10/778,674, Final Office Action mailed Jul. 28, 2008", 21 pgs.

"U.S. Appl. No. 10/778,674, Non Final Office Action mailed Jul. 12, 2007", 17 pgs.

"U.S. Appl. No. 10/778,674, Non-Final Office Action mailed Jan. 11, 2008", 3 pgs.

"U.S. Appl. No. 10/778,674, Non-Final Office Action mailed Mar. 24, 2009", 34 pgs.

"U.S. Appl. No. 10/778,674, Non-Final Office Action mailed Mar. 25, 2010", 27 pgs.

"U.S. Appl. No. 10/778,674, Response filed Feb. 19, 2010 to Final Office Action mailed Oct. 23, 2009", 11 pgs.

"U.S. Appl. No. 10/778,674, Response filed Apr. 11, 2008 to Non-Final Office Action filed Jan. 11, 2008", 14 pgs.

"U.S. Appl. No. 10/778,674, Response filed Jun. 24, 2009 to Non Final Office Action mailed Mar. 24, 2009", 13 pgs.

"U.S. Appl. No. 10/778,674, Response filed Nov. 13, 2007 to Non-Final Office Action mailed Jul. 12, 2007", 14 pgs.

"U.S. Appl. No. 10/778,674, Response filed Dec. 29, 2008 to Final Office Action mailed Jul. 28, 2009", 12 pgs.

"At a Glance : Secure Mail", Deluxe Financial Services, Inc., (May 2000), 1-2.

"Computerized Device Could Bring Check Printing In-House", American Banker, (Nov. 17, 1982), 14.

"Deluxe.com", [Online]. [Archived Nov. 30, 2001]. Retrieved from the Internet: <URL: http://web.archive.org/web/20011130135538/http://www.deluxe.com/>, (Retrieved Sep. 15, 2007), 14 pgs.

"Deluxe; Personal Checks, Business Checks, Bank and Credit Union Products", [Online]. Retrieved from the Internet: <URL:http://www.deluxe.com>, (Accessed Aug. 25, 2003), 2 pgs.

"Harland Check Products Now Available Via Internet; Consumers can Order Online With the checks center", PR Newswire, (Feb. 10, 2000), 1-4 pages.

Lewis, et al., "", Change your branches to physical portals. ABA Banking Journal., (Jun. 2000), 1-4.

* cited by examiner

SYSTEM AND METHOD FOR PREVENTING FRAUD IN CHECK ORDERS

RELATED APPLICATION

This application is a Continuation of U.S. patent application Ser. No. 10/702,121, filed Nov. 5, 2003, which claims priority to U.S. Provisional Patent Application Ser. No. 60/434,266, filed on Dec. 17, 2002, which are herein incorporated by reference in their entirety.

TECHNICAL FIELD

This patent application relates to processing paper check orders, and in particular, to a system and method for detecting suspect check orders and thereby preventing the processing of fraudulent orders.

BACKGROUND

Despite the proliferation of credit and debit cards, the use of printed checks remains popular. Unfortunately, there are abuses of paper checks committed by the account holder and there are other abuses that result in fraud and injure an innocent person or business. Technology exists to notify merchants of checks that are likely to have insufficient funds. This greatly limits a person's ability to use their own checks when they have little or no money to cover a check. But this technology does not help an innocent account holder whose checks have been fraudulently obtained by another.

One way to obtain another's checks is to steal them. Another way is to use another's identity to illegally obtain checks with the innocent person's account information imprinted on the checks. Thus, many forms of fraud begin when a person orders new checks under another's identity for a fraudulent use. This is a problem check printers and financial institutions face when processing check orders. It is no small task to detect these situations, since check printers and financial institutions process millions of check orders every year. Furthermore, no one likes to be falsely suspected of a fraudulent order. Thus, the check printer must carefully search for improper orders to prevent those who would commit fraud from obtaining checks for improper uses while not adversely impacting orders for innocent account holders.

One method of identifying questionable check orders is for a trained ordering agent, or customer service agent, to look for clues that the order is improper. Generally, the clues are details related to the check ordering process. These details are sometimes referred to as order parameters. While there are a number of ways to assess the risk or reliability in a check order, it is problematic for a check distributor to assess all of the order parameters by systematic means. Because some order parameters are more indicative of risk than others, judging the level of risk associated with the order parameters can be subjective and thus difficult to judge uniformly.

Therefore, what is needed in the art is a sophisticated system and method for reviewing paper check orders. The system should use existing information to spot potentially bad check orders for further investigation before the check orders are filled. Such a system would be even more desirable if it could process statistical information from past improper orders for improved check order processing in the future.

SUMMARY

The present subject matter addresses the needs indicated above and other needs not expressly stated to provide a system and method for detection of suspect paper check orders. In varying embodiments, the system comprises client storage capable of storing client information including data from previous paper check orders, suspect check order storage capable of storing suspicious order information including data associated with previous improper check orders, an order entry system for inputting order information having order parameters, and a programmable scoring system in communication with the client storage and the suspect order storage. The scoring system is capable of applying scoring rules to score paper check orders and the scoring rules are programmably adjustable for variable weights to the order parameters. The programmable scoring system is capable of comparing input order information to the client information and the suspicious order information and producing a score according to the scoring rules to determine check orders that require further investigation.

Varying embodiments of the method comprise inputting paper check order information that has order parameters, applying adjustable weights to each of the order parameters, and applying scoring rules to score paper check orders. Applying the scoring rules includes comparing the order information to the client information and the suspicious order information, producing a score according to the scoring rules, and identifying check orders that require further investigation according to the produced score.

This Summary is an overview of some of the teachings of the present application and not intended to be an exclusive or exhaustive treatment of the present subject matter. Further details about the present subject matter are found in the detailed description and appended claims. Other aspects of the invention will be apparent to persons skilled in the art upon reading and understanding the following detailed description and viewing the drawings that form a part thereof, each of which are not to be taken in a limiting sense. The scope of the present invention is defined by the appended claims and their legal equivalents.

BRIEF DESCRIPTION OF THE DRAWINGS

In the drawings, where like numerals refer to like components throughout the several views.

DETAILED DESCRIPTION

In the following detailed description, reference is made to the accompanying drawings forming a part hereof, and in which is shown by way of illustration specific embodiments in which the invention may be practiced. It is to be understood that other embodiments may be utilized and structural changes may be made without departing from the scope of the present invention.

Figure 1:
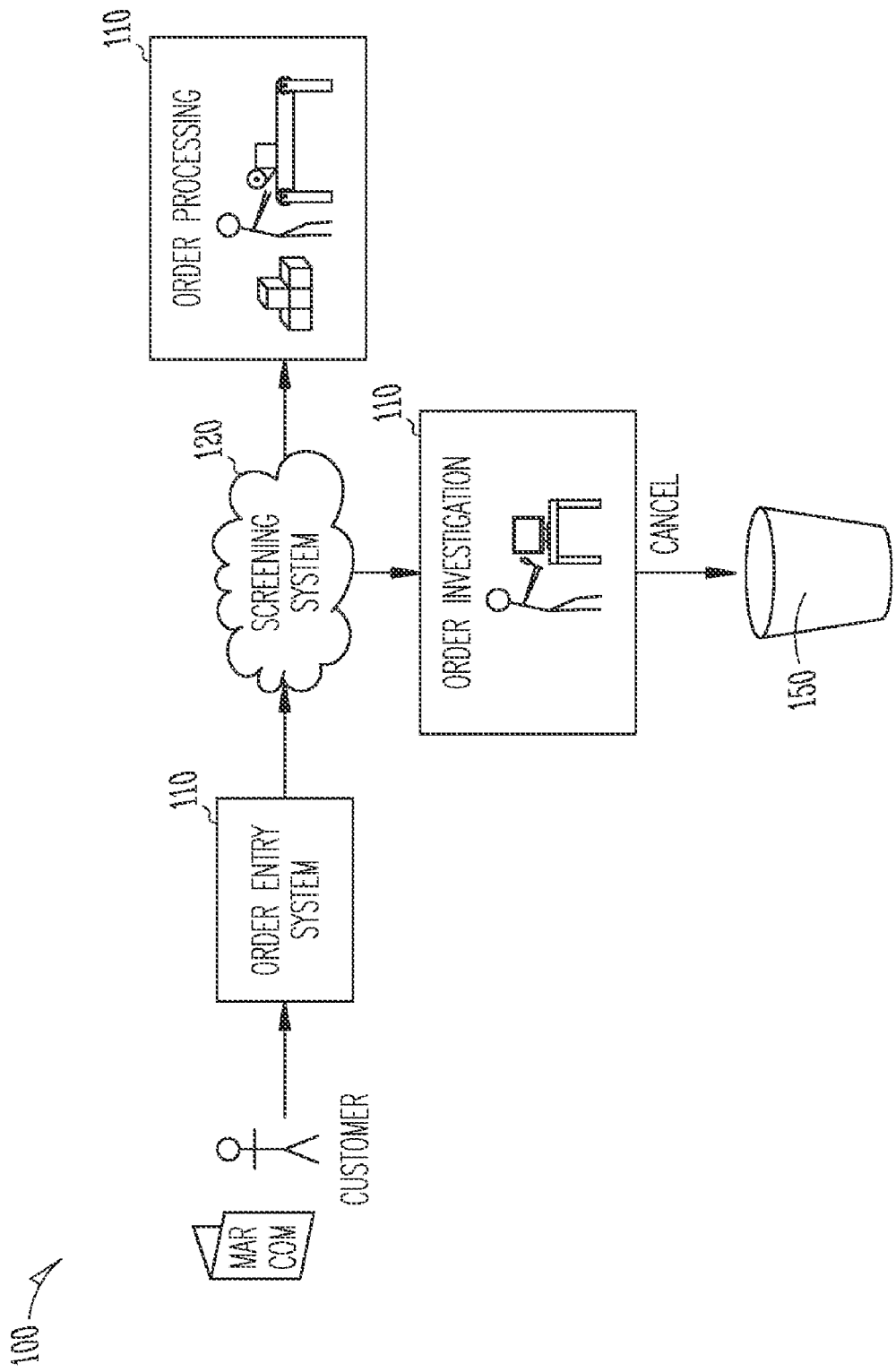
FIG. 1 shows an embodiment of a system for processing paper check orders.

This detailed description discusses a system and method for detection and processing of suspect or improper paper check orders. FIG. 1 shows an embodiment of a system 100 for processing the paper check orders. The system 100 includes a paper check order entry system 110 to receive an order and a screening system 120 to screen for suspect orders.

The order may originate in several ways. The order may originate directly from the customer, the order may be placed by a financial institution or a check distributor on behalf of the customer, or a financial institution may refer the customer to place the order.

The order entry system 110 accommodates various ordering methods used by a customer, financial institution, or distributor to place an order. The various ordering methods include, but are not limited to, an order placed over the telephone, a telephone order placed over a toll free long distance number, an order placed over the Internet, a dedicated network, or other network, a phone order placed using an integrated voice response (IVR) system, an order placed by mail, and combinations thereof. In varying embodiments the check orders are processed by an ordering agent, by automatic processing means, or by combinations thereof. Some examples of an automatic processing means include, but are not limited to, an order processed by software receiving the order over the Internet or other network, an order processed by a menu navigated by a touch-tone phone, or combinations thereof.

Once the order is received it is screened for risk by the screening system 120. If the order is passed by the screening system 120, then it is determined to pose a reasonable risk and is processed 140 and shipped to the customer. If the order is not passed by the screening system 120 it is submitted to further investigation 130. The investigation 130 results either in passing the order for processing 140, canceling the order 150, or some other investigation action. The investigation 130 is more rigorous and thorough than the screening system 120, but in some cases the indication of risk in the order from the screening may be so strong that the investigation 130 cancels the order based solely on the screening analysis. The outcome of the investigation 130 may produce information about check fraud that can be used in screening future orders. If so, this information is added to the screening system 120.

To receive the check order, order information is input into the order entry system 110. The order information includes check order parameters. In general, order parameters input to the system 100 indicate some degree of risk or reliability in the order. Order parameters include, but are not limited to, order parameters related to the customer's identity, parameters related to the method used to place the order, and parameters related to check order details requested by the customer.

Order Parameters Related to the Customer's Identity

Order parameters related to the customer's identity include the customer name, shipping address and zip code, the checking account number supplied by the customer, the bank number associated with the account number, and the number of the phone placing the order. Other order parameters associated with the identification of the customer include not capturing a caller's identification on an incoming call, the incoming phone number not matching a customer's known phone number, the phone call originating from a pay phone, not matching the incoming number in a change of address database, or not matching the name, business name, or address when verifying the information by automated directory assistance. Additional embodiments of order parameters include the customer not being able to provide a correct password, or the customer not responding to a confirmation requested by e-mail. Also, order parameters related to the number of the phone placing the order include the number of orders related to that phone number within a predetermined timeframe and the number of customers related to that phone number within a predetermined timeframe.

Further, if the order is made through customer service, another order parameter is a subjective assessment of the risk of fraud made by a trained ordering agent. In one embodiment, the agent presses a button to interrupt the order entry system 110 or flag the order. In another embodiment, the ordering agent enters such an assessment into the order entry system by a keypad into a field of the order information. The system 100 handles this agent input as another order parameter or the system 100 flags the order as requiring further investigation and does not execute any further processing on the order.

Order Parameters Related to the Method Used to Place the Order

Order parameters related to the method used to place the order include an ordering method as discussed previously and the market channel that induced the customer to place an order. Market channels include, but are not limited to, a catalog or other marketing communication mailed or e-mailed to the customer, a referral by another customer, a referral by a bank, or an order originating from a second source such as a financial institution, or check distributor, retailer, or wholesaler.

Order Parameters Related to Details of the Check Order Requested by the Customer Order parameters related to details of the check order requested by the customer include the starting check number of the order, the quantity of checks ordered, the number of orders placed by a customer within a predetermined timeframe, and the type of check product ordered. If the starting check number, the quantity of checks ordered, or the number of orders placed within a predetermined timeframe is outside of an expected range for the identified customer this may be an indication of risk in processing the order. If the check product ordered is unexpected or otherwise inappropriate for the identified customer this also may be an indication of risk. Other order parameters associated with the details of the check order requested include a request for no address imprinted on the check, or a change in the information imprinted on the check such as the name or the address. Another order parameter associated with the details of the check order is the check order shipping method; as for example, a request for expedited shipping, a request to ship to a one-time "special" address, or a request to ship to a P.O. box.

All of these order parameters involve different amounts of order reliability or order risk that need to be uniformly assessed by the processing system 100. A table of order parameters appears below. The table is not intended to be exhaustive of all order parameters used. Determining order behaviors is an ongoing process. As more information concerning risk and reliability of check orders is accumulated, order parameters are added or removed to reflect the updated information.

Screening System

Figure 2:
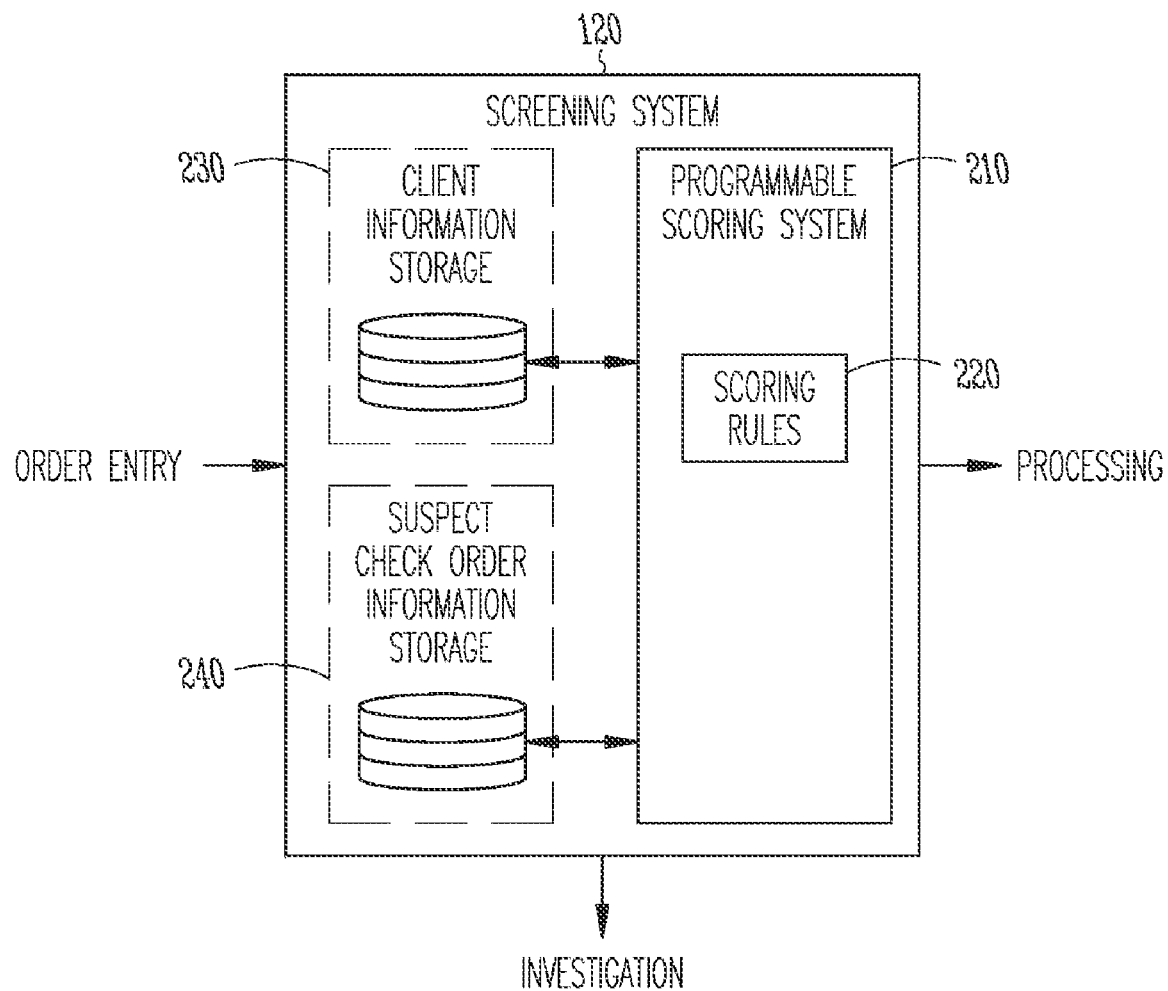
FIG. 2 shows an embodiment of the screening system.

FIG. 2 shows an embodiment of the screening system 120. The embodiment includes a programmable scoring system 210, client information storage 230 and suspect check order information storage 240. The suspect order information storage 240 includes such information as names, addresses, zip codes, account numbers and phone numbers associated with improper paper check orders. The suspect information may contain either "warm" or "hot" file information or a combination of the types. Warm file information is known to be related to a heightened degree of risk in the order. In contrast, hot file information is known for certain to indicate fraud. For example, a hot file address would be an address given as a business or home that was actually an address known to be used for fraud.

TABLE 1

Order parameters related to the Customer's Identity:

Customer Name
Shipping Address
Zip Code
Account No.
Bank No.
Phone number used to place the order (Incoming phone number)
Incoming Phone number is a pay phone number
Incoming phone number is related to "X" orders within a timeframe
Incoming phone number is related to "X" customers within a timeframe
The customer's identification is not captured on the incoming call (caller ID)
Incoming phone number doesn't match a customer's known number
Incoming phone number doesn't match information in directory assistance
The order was flagged by an ordering agent Order parameters related to the method used to place the order:

The order is placed over the phone by the customer
The order is placed over the phone by the customer's financial institution
The order is placed by phone via a toll free long distance number
The order is placed over the Internet
The order is placed by phone using an integrated voice response (IVR) system
The order is placed by mail
The customer placed the order in response to a marketing communication
The customer was referred by another customer
The customer was referred by a bank
The order originated from a check retailer Order parameters related to details of the check order requested by the customer:

The starting check number of the order
The quantity of checks ordered
The number of orders placed by a customer within a timeframe
The type of check product ordered
The order contains a change in the check imprint
The order contains no address on the check imprint
The order requests expedited shipping
The shipping address is a one-time address
The shipping address is a P.O. box The scoring system 210 compares an incoming order parameter, such as a parameter related to a customer's identity, against the stored client and suspect order information to determine whether the parameter indicates reliability or risk. In one embodiment of the screening system 120, the suspect check order information is created and maintained by the check vendor. In another embodiment, the information is provided by a third party such as a bank, an organization or network interested in preventing fraud in check orders. In yet another embodiment, a financial institution provides information on bad accounts and the information is loaded into the warm file.

Yet another embodiment of the scoring system 210 includes financial institution information storage. The financial institution information includes a database of newly opened accounts. The database includes the account holders' names, addresses, phone numbers, account numbers and bank numbers. The scoring system 210 compares an incoming order parameter against the stored financial institution information to determine whether the parameter indicates reliability or risk. For example, if a new order does not match the new order information, the system would indicate increased risk in the order. In one embodiment, the financial institution information is sorted by account number/bank number. In another embodiment, the financial institution provides bankruptcy information. If a new order matches information in the bankruptcy information, the system would also indicate increased risk in the order.

The programmable scoring system 210 applies scoring rules 220 to the individual order parameters. The scoring rules 220 provide a uniform assessment from order to order that a parameter indicates risk or reliability. For example, if the incoming phone number does not match the phone stored for a customer, the scoring rules change the score to reflect increased risk. If the incoming order parameter matches a parameter in the client order information for an order that was filled successfully, the score given reflects more confidence in the order. In one embodiment, a positive number is given to an order parameter for an indication of risk and a negative number is given for an indication of reliability, with a lower score indicating higher confidence in the order. One embodiment of a programmable scoring system 210 is shown below in Table 2. Order parameters that indicate risk or confidence in the order and are to be scored are listed horizontally in the columns. The order parameters indicate risk (e.g. a change in the check imprint) or indicate reliability (e.g. the customer information matches a client master file). Other order parameters determine an adjustable weight given to a score. In the embodiment shown, these are listed in the rows. These order parameters include whether the order is a new order or re-order and the ordering channel used. The order parameters listed in the rows also include whether the customer placing the order was a preferred customer. Preferred customers are highly reliable customers such as a financial institution or a check distributor. Preferred customers also include those customers who consistently have an amount of business above a threshold level, and often have a dedicated account representative due to the volume of their business. The parameters shown in the table are not meant to be an exhaustive list, but rather to only discuss one embodiment of a scoring system 210.

The weights assigned to scores vary with the row, with order parameters having more indication of risk given a stronger weight than parameters having less indication of risk. For example, scores given a re-order sent by fax from a financial institution are assigned different weights than a new order placed by Internet directly by an end user customer. The weights are adjustable, so that as more information concerning risk and reliability of check orders is accumulated, the weights are programmably changed to better reflect the updated information. A net score for the incoming order is then calculated. If the calculated net score for the order exceeds a predetermined threshold value, enough risk is present to flag the order as requiring further investigation 130 before processing 140 the order. If the net score does not exceed the threshold value, the order is processed. The threshold value for a fail score is also adjustable and is selectively variable with the rows in table 2.

Table 3 shows two simplified examples of using the scoring system embodiment in Table 2. In example A, a re-order is received by Fax from a financial institution that is a preferred customer and the institution is placing the order on behalf of one of its customers. The imprint on the check has changed between orders and the starting check number indicates risk, but the customer information for the bank's customer matches information in the customer master file. In this simplified example a score of −10 is given to the check imprint and the check number order parameters, and a score of +20 is given

TABLE 2

| | | Check Imprint change between orders | Ship to Address does not match master file | Ship to Address on warm file | High Risk Check Start Number | Account number on warm file | No phone number captured | Incoming Phone number on warm file | Incoming Customer Info matches master file | Fail Score — Net Score |
|---|---|---|---|---|---|---|---|---|---|---|
| New Orders | | | | | | | | | | |
| Preferred Customer | Order Channel Internet Mail Fax Other | | | | | | | | | |
| Other Customer | Internet Mail Fax Other | | | | | | | | | |
| Re-orders | | | | | | | | | | |
| Preferred Customer | Order Channel Internet Mail Fax Other | | | | | | | | | |
| Other Customer | Internet Mail Fax Other | | | | | | | | | | to the customer matching order parameter. The net score calculated is 0. If the fail score was set to −40 for the row, the order is passed to processing.

In example B, a re-order is received over the Internet directly from an end user of the checks. As in example A, the imprint on the check has changed between orders, the starting check number indicates risk and the customer information matches information in the customer master file. In this row of Table 3, the order parameters indicating risk are weighted three times heavier than in example A. A score of −30 is given to the check imprint and the check number order parameters, and a score of +20 is again given to the customer matching order parameter. Here the net score calculated is −40. If the fail score was set to −30 for the row, the order is flagged.

If an order fails by exceeding the threshold score, the order is given further investigation. In one embodiment, the order is either released to processing 140 or cancelled as a result of the investigation 130. In another embodiment, the investigation 130 involves notifying a bank that a check order for a specific account was improper. Variations of the embodiment include placing a phone call to the bank, automatically sending an e-mail message, automatically issuing a message by fax, or automatically issuing a batch transmission of data to the bank. In yet another embodiment, this notification is done by matching the account number to the bank number. In yet another embodiment, the investigation involves notifying the customer of a canceled order.

In one implementation embodiment, the scoring is implemented by a software system. In another embodiment, at least part of the scoring of the order is implemented manually by, for example, a screening agent. In yet another embodiment, a financial institution has its own dedicated scoring system. In one embodiment of a dedicated scoring system, the system includes the scores and weights desired by the financial institution. In another embodiment of a scoring system, the system includes additional columns and/or rows. One skilled in the art would understand from reading this description that various combinations of order parameters and various combinations of manual and automatic scoring are possible without departing from the scope of the present system.

TABLE 3

| | | Check Imprint change between orders | Ship to Address does not match master file | Ship to Address on warm file | High Risk Check Start Number | Account number on warm file | No phone number captured | Incoming Phone number on warm file | Incoming Customer Info matches master file | Fail Score — Net Score |
|---|---|---|---|---|---|---|---|---|---|---|
| New Orders | | | | | | | | | | |
| Preferred Customer | Order Channel Internet Mail Fax Other | | | | | | | | | |

TABLE 3-continued

|  |  | Check Imprint change between orders | Ship to Address does not match master file | Ship to Address on warm file | High Risk Check Start Number | Account number on warm file | No phone number captured | Incoming Phone number on warm file | Incoming Customer Info matches master file | Fail Score — Net Score |
|---|---|---|---|---|---|---|---|---|---|---|
| Other Customer |  |  |  |  |  |  |  |  |  |  |
|  | Internet |  |  |  |  |  |  |  |  |  |
|  | Mail |  |  |  |  |  |  |  |  |  |
|  | Fax |  |  |  |  |  |  |  |  |  |
|  | Other |  |  |  |  |  |  |  |  |  |
| Re-orders |  |  |  |  |  |  |  |  |  |  |
| Preferred Customer | Order Channel |  |  |  |  |  |  |  |  |  |
|  | Internet |  |  |  |  |  |  |  |  |  |
|  | Mail |  |  |  |  |  |  |  |  |  |
| A | Fax | −10 |  |  | −10 |  |  |  | +20 | −40 / 0 |
|  | Other |  |  |  |  |  |  |  |  |  |
| Other Customer |  |  |  |  |  |  |  |  |  |  |
| B | Internet | −30 |  |  | −30 |  |  |  | +20 | −30 / −40 |
|  | Mail |  |  |  |  |  |  |  |  |  |
|  | Fax |  |  |  |  |  |  |  |  |  |
|  | Other |  |  |  |  |  |  |  |  |  |

Another aspect to implementing a screening system is to use cost in deciding which order parameters to monitor and how to monitor the order parameters. The number of employees needed and processing costs are taken into account in determining the best order parameters and methods of monitoring the ordering parameters, and even in setting the score weights and thresholds. In one embodiment, if analysis reveals that a screening system needs additional customer information, an implementation of a change could either create or buy a database of additional information. In another embodiment, the system could be tied into a vendor's database to automatically access the required information. In yet another embodiment, the screening system accesses a phone company's database to automatically check the information against a database such as a directory assistance data base. In yet another embodiment, the screening system accesses a financial institution's database.

Closed Loop Scoring System

Figure 3:
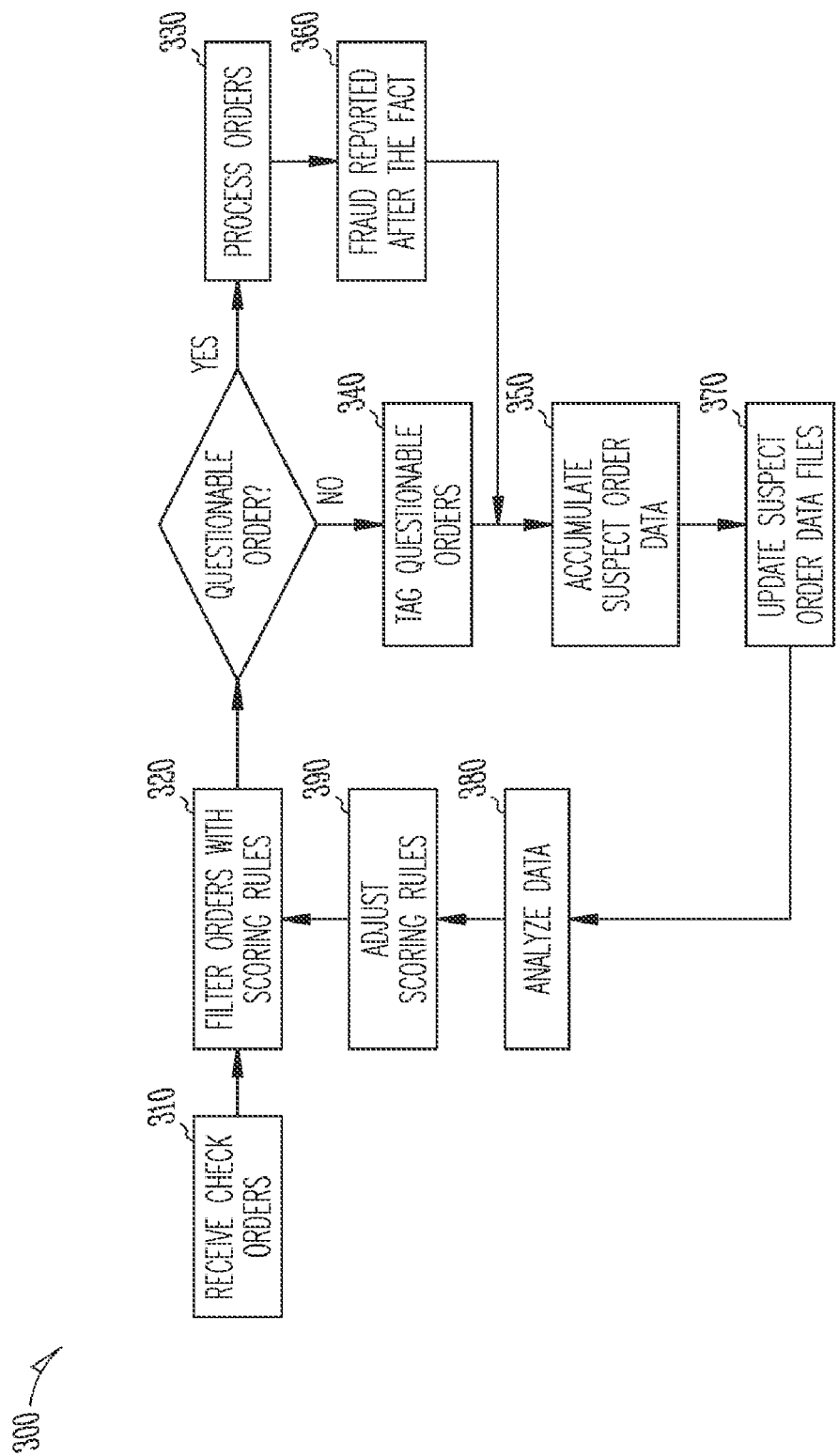
FIG. 3 shows an embodiment of a closed loop system for adjusting scoring rules of a screening system.

FIG. 3 shows an embodiment of a closed loop system 300 for adjusting scoring rules of a screening system 120. The system is closed loop in that feedback from past suspicious orders is input to the system to adjust the scoring rules. At 310, check orders are received. At 320, a filter is applied to the orders in the form of scoring rules. If applying the filter determines that the order is not questionable, the order is processed 330. If applying the filter determines that the order is questionable, the questionable order is tagged 340. As orders are identified or tagged as being questionable, the system 300 accumulates data on these orders 350. Sometimes fraud may still occur after the order is processed 330. If fraud occurs after the fact 360, data on these orders is also accumulated 350. At an occurrence of a predetermined event, the data is used to update the suspect order data files 370. In one embodiment, the event is a number of orders processed. In another embodiment, the event is the passing of a timed duration such as a day. At 380, the accumulated data is analyzed. Based on the analysis the screening rules are adjusted 390. In one embodiment, the rule adjustment includes adjusting the weights given to scores. In another embodiment, the analysis adds parameters to the scoring system 210.

The analysis of the data can be a short term or long term analysis. In one embodiment of a short term analysis, the system determines that the amount of fraud detected is too low. In response, the weights given to scores are adjusted and/or thresholds for net scores are adjusted to increase the percentage of orders that are flagged for investigation.

A long term analysis determines if changes need to be made to the order parameters. Changing the order parameters includes adding or removing order parameters in addition to changes in the score weights and thresholds. In one embodiment, statistical analysis determines correlations between parameters of the orders and attempted fraud. One example of statistical analysis is logistic regression. In another embodiment, decision trees are used to adjust or change order parameters. In yet another embodiment, predictive modeling is used to determine correlations and adjust or change order parameters. One example of predictive modeling is neural net modeling.

Method for Processing Check Orders

Figure 4:
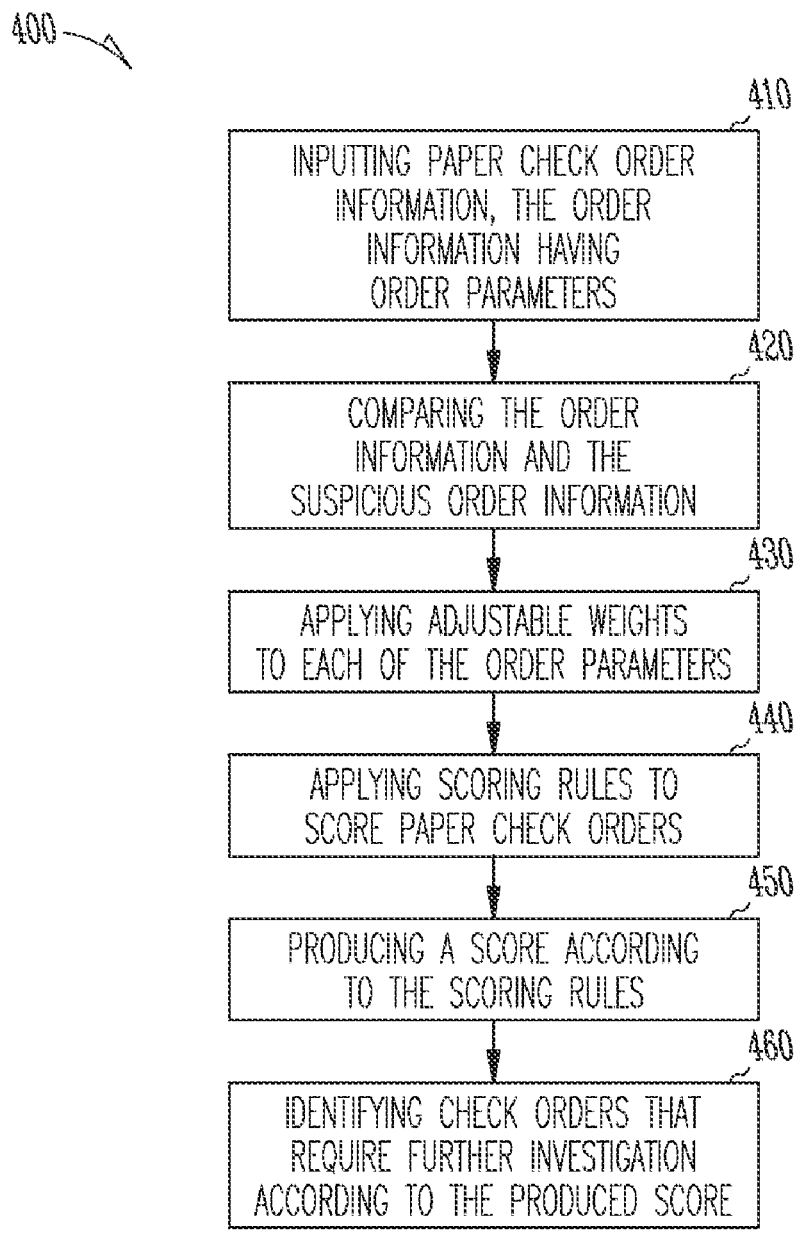
FIG. 4 shows a flow chart of an embodiment of a method for processing paper check orders.

FIG. 4 shows a flow chart of an embodiment of a method 400 for processing paper check orders. At 410, paper check order information containing order parameters is input to the system. At 420, the order information is compared to the suspicious order information. At 430, adjustable weights are applied to the order parameters. At 440, scoring rules are applied to the paper check orders. At 450, a score is produced according to the scoring rules. At 460, check orders that require further investigation are identified according to the produced score.

Generating Check Orders Automatically

Figure 5:
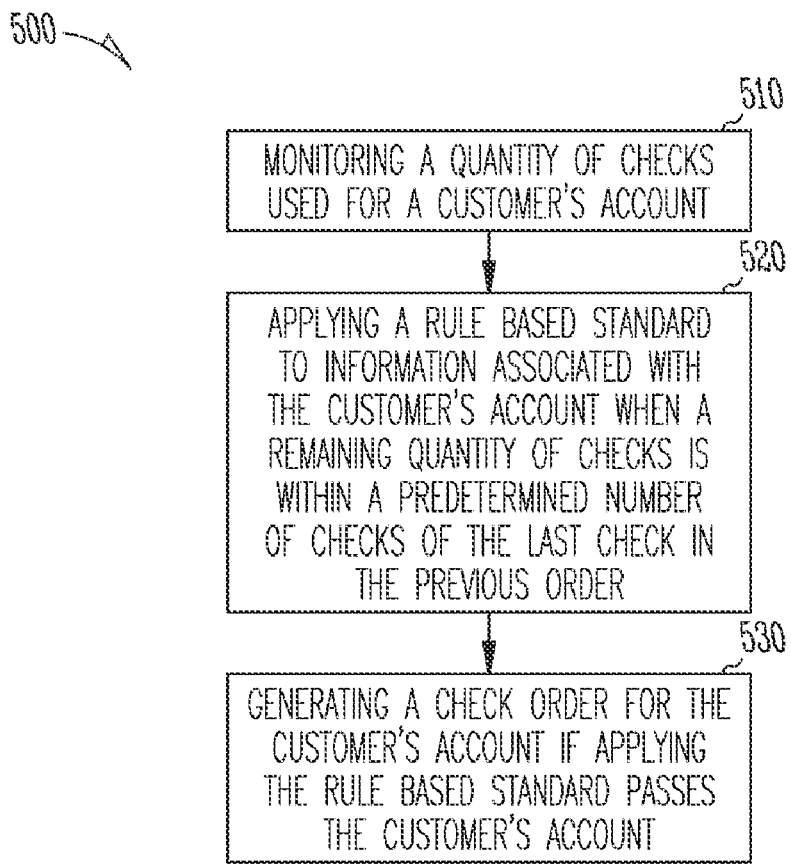
FIG. 5 shows a flowchart of one embodiment of a method for automatically generating orders for paper checks.

FIG. 5 shows a flowchart of one embodiment of a method 500 for automatically generating orders for paper checks. At 510, the quantity of checks remaining for customer's account is monitored. At 520, when the remaining quantity of checks is within a predetermined number of checks, a rule based standard is applied to information associated with the customer's account. In one embodiment, the rule based standard applies scoring rules based on previous client information. At 530, a check order is generated for the customer's account if applying the rule based standard passes the customer's account. In another embodiment of the method 500, the quantity of checks for the generated order is based in part on a time frame the quantity of checks for the previous order was used. In another embodiment, the generated order is not processed until a confirmation e-mail is received from a customer in response to an e-mail sent to the customer notifying the customer of the order. Security in generating the order would be further enhanced by having the customer supply a password along with the confirmation.

Although specific examples have been illustrated and described herein, it will be appreciated by those of ordinary skill in the art that other arrangements calculated to achieve the same purpose may be substituted for the specific example shown. This application is intended to cover any adaptations or variations of the present invention. Therefore, it is intended that this invention be limited only by the claims and the equivalents thereof.

What is claimed is:

1. A system for screening check orders, comprising:
   client storage configured to store client information including data from previous paper check orders, and including a parameter relating to a quantity of checks ordered in a customer's account;
   suspect check order storage configured to store suspicious order information including data associated with previous improper check orders;
   an order entry system for inputting order information at least some of which information is provided over a network, the order information having order parameters including a parameter indicative of whether a customer placing an order is a financial institution; and
   a programmable scoring system in communication with the client storage, the suspect order storage, and the order entry system, and the programmable scoring system configured to apply scoring rules to score paper check orders, the scoring rules programmably adjustable for variable weights to the order parameters including selection of a different weighting for orders placed by a customer that is identified as a financial institution than a weighting for orders by customers not identified as a financial institution, wherein the programmable scoring system is configured to compare the input order information to the client information and the suspicious order information and produce a score according to the scoring rules to determine check orders that require further investigation and to determine check orders to generate, wherein the system includes a comparison of the parameter relating to quantity of checks to a predetermined value to identify potentially suspicious orders, and wherein the programmable scoring system includes feedback from past suspicious orders to programmably adjust the scoring rules.

2. The system of claim 1, the programmable scoring system further including threshold value storage such that the score is compared to a threshold value, the check order identified for further investigation if the score exceeds the threshold value.

3. The system of claim 1, wherein the suspect order storage includes zip codes.

4. The system of claim 3, wherein the suspect order storage further includes addresses.

5. The system of claim 4, wherein the suspect order storage further includes phone numbers.

6. The system of claim 5, wherein the suspect order storage further includes checking account numbers.

7. The system of claim 6, wherein suspect order storage further includes names.

8. The system for screening check orders of claim 1, wherein the system further includes financial institution information storage configured to store information associated with newly opened accounts.

9. The system of claim 1, wherein the order entry system includes an input means to accept input from an ordering agent to flag a check order as requiring further investigation.

10. The system of claim 1, wherein the scoring rules are programmably adjusted for a particular financial institution.

11. A method of screening paper check orders using client information in a client storage and suspicious order information in a suspect check order storage, comprising:
    inputting paper check order information into an order entry system, the paper check order information having order parameters including a parameter indicative of whether a customer placing an order is a financial institution and a parameter relating to a quantity of checks ordered for a customer's account;
    applying adjustable weights to each of the order parameters including selection of a different parameter weight for orders placed by a customer that is identified as a financial institution than a parameter weight for orders by customers not identified as a financial institution;
    applying scoring rules to score the paper check orders using a programmable scoring system, including:
       comparing the input paper check order information to the client information and the suspicious order information using the programmable scoring system, including a comparison of the parameter relating to quantity of checks to a predetermined value to identify potentially suspicious orders;
       producing a score according to the scoring rules; and
       identifying check orders that require further investigation according to the produced score; and
    adjusting the scoring rules using feedback from past suspicious orders, wherein at least a portion of the inputting is performed using a network and the programmable scoring system is at least Partially performed by a software-based system.

12. The method of claim 11, wherein the method further includes comparing the produced score against a predetermined threshold value, and wherein the identifying check orders that require further investigation according to the produced score includes the produced score exceeding the predetermined threshold value.

13. The method of claim 12, wherein producing a score includes increasing the score if the incoming order parameter matches a parameter in order information that resulted in a suspicious order and reducing the score if the incoming order parameter matches order information that resulted in a successful order.

14. The method of claim 12, wherein the predetermined threshold value is predetermined in part by the presence of a check order parameter.

15. The method of claim 12, wherein identifying check orders that require further investigation according to the produced score includes adjusting the weights for the scoring rules for the order parameters.

16. The method of claim 15, wherein the identifying check orders that require further investigation according to the produced score further includes passing the check order if the produced score does not exceed the predetermined threshold value.

17. The method of claim 16, wherein the identifying check orders that require further investigation according to the produced score further includes canceling the check order if the produced score exceeds the predetermined threshold value.

18. The method of claim 16, wherein identifying check orders that require further investigation includes notifying a bank where a checking account resides that the check order was identified for further investigation if the produced score exceeds the predetermined threshold value.

19. The method of claim 16, wherein identifying check orders that require further investigation includes sending an e-mail notification to a customer and not processing the check order until a return e-mail is received from the customer if the produced score exceeds the predetermined threshold value.

20. The method of claim 16, wherein identifying check orders that require further investigation includes sending an e-mail notification to a financial institution and not processing the check order until a return e-mail is received from the financial institution if the produced score exceeds the predetermined threshold value.

21. The method of claim 11, wherein applying adjustable weights includes adjusting the weights according to a value of a check order parameter.

22. The method of claim 21, wherein the check order parameter includes an ordering channel used to place the order.

23. The method of claim 21, wherein the check order parameter includes a marketing channel used to reach the customer.

24. The method of claim 21, wherein the check order parameter includes whether the incoming order is a new order or a re-order.

25. The method of claim 11, wherein the suspicious order information includes checking account numbers.

26. The method of claim 25, wherein the suspicious order information further includes phone numbers.

27. The method of claim 21, wherein the suspicious order information further includes zip codes.

28. The method of claim 27, wherein the suspicious order information further includes addresses.

29. The method of claim 28, wherein the suspicious order information further includes names.

30. The method of claim 11, wherein the inputting check order information further includes accepting input from an ordering agent to flag a check order as requiring further investigation.

31. The method of claim 11, wherein the order parameters are order parameters requested by a customer including a type of check product ordered.

32. The method of claim 31, wherein the order parameters requested by the customer further include a check order quantity.

33. The method of claim 31, wherein the order parameters requested by the customer further include a check order starting number.

34. The method of claim 31, wherein the order parameters requested by the customer further include a change in the check imprint between orders.

35. The method of claim 31, wherein the order parameters requested by the customer further include a request for a check imprint that lacks an address.

36. The method of claim 31, wherein the order parameters requested by the customer further include a number of orders originating from a customer falling outside of a predetermined range of order numbers within a predetermined time period.

37. The method of claim 31, wherein the order parameters requested by the customer further include order shipping information.

38. The method of claim 37, wherein the order shipping information further includes a shipping zip code.

39. The method of claim 38, wherein the order shipping information further includes a shipping address.

40. The method of claim 37, wherein the order shipping information further includes a shipping method.

41. The method of claim 11, wherein inputting the order information having order parameters includes capturing the order information from a telephone ordering channel.

42. The method of claim 41, wherein the order parameters include an incoming phone number.

43. The method of claim 42, wherein the order parameters further include a number of orders originating from the phone number falling outside of a predetermined range of order numbers within a predetermined time period.

44. The method of claim 42, wherein the order parameters further include a number of customers related to the phone number falling outside of a predetermined range of a number of customers within a predetermined time period.

45. The method of claim 42, wherein the order parameters further include whether a caller's identification is captured on an incoming call.

46. The method of claim 42, wherein the order parameters further include whether an incoming phone number matches a number in a customer phone number master file.

47. The method of claim 42, wherein the incoming phone number is a pay phone number.

48. The method of claim 42, wherein the order parameters further include whether an incoming phone number matches a number in a financial institution phone number master file.

49. The method of claim 42, wherein the order parameters further include whether an incoming phone number matches a customer or company name and address given by a caller when verifying the phone number by automated directory assistance.

50. The method of claim 42, wherein the order parameters further include whether an incoming phone number matches a customer or company name and address given by a caller includes looking up the number in a change of address database.

* * * * *